United States Patent [19]

Gould et al.

[11] Patent Number: 5,428,082
[45] Date of Patent: Jun. 27, 1995

[54] NON-CYCLIC POLYANHYDRIDE AND EPOXY, POLYOL OR POLYAMINE RESIN

[75] Inventors: Michael L. Gould; David A. Grilli; Marvin L. Dettloff; Richard A. Hickner, all of Lake Jackson; James A. Rabon, West Columbia, all of Tex.

[73] Assignee: The Dow Chemical Company, Midland, Mich.

[21] Appl. No.: 194,785

[22] Filed: Feb. 10, 1994

Related U.S. Application Data

[63] Continuation of Ser. No. 974,569, Nov. 12, 1992, abandoned.

[51] Int. Cl.$^6$ .......................... C08K 5/11; C08K 5/01; C08L 63/02; C08L 33/14
[52] U.S. Cl. .......................... 523/400; 523/454; 523/455; 523/463; 524/315; 524/317; 524/361; 524/365; 525/117; 525/119; 525/174; 525/207; 525/221; 525/329.7; 525/488; 525/533
[58] Field of Search ............... 524/317, 361, 365, 315; 525/114, 329.7, 117, 119, 174, 207, 221, 488, 533; 562/887; 523/400, 454, 455, 463

[56] References Cited

U.S. PATENT DOCUMENTS

| | | |
|---|---|---|
| 1,993,828 | 3/1935 | Brubaker et al. |
| 3,250,752 | 5/1966 | Walter . |
| 3,310,518 | 3/1967 | Maloney . |
| 3,360,543 | 12/1967 | Hoy et al. ............... 260/475 |
| 3,523,930 | 8/1970 | Maloney . |
| 3,523,940 | 9/1970 | Maloney . |
| 3,631,156 | 12/1971 | Vaughn . |
| 3,631,157 | 12/1971 | Vaughn . |
| 3,803,087 | 4/1974 | Vaughn . |
| 3,933,746 | 1/1976 | Steele . |
| 4,043,956 | 8/1977 | Hutton et al. ............ 428/461 |
| 4,210,737 | 7/1980 | Kennedy et al. .......... 525/274 |
| 4,279,793 | 7/1981 | Wellner et al. ........... 528/220 |
| 4,308,363 | 12/1981 | Vaughn . |
| 4,452,948 | 6/1984 | Marrion et al. ........... 525/207 |
| 4,652,529 | 3/1987 | Collins et al. ............ 436/92 |
| 4,703,101 | 10/1987 | Singer et al. ............ 525/438 |
| 4,710,543 | 12/1987 | Chattha et al. ........... 525/161 |
| 4,732,791 | 3/1988 | Blackburn et al. ........ 428/413 |
| 4,749,743 | 6/1988 | Ambrose et al. .......... 525/185 |
| 4,755,581 | 7/1988 | Blackburn et al. ........ 528/93 |
| 4,764,430 | 8/1988 | Blackburn et al. ........ 428/413 |
| 4,798,746 | 1/1989 | Claar et al. ............. 525/207 |
| 4,816,500 | 3/1989 | Corcoran ............... 525/207 |
| 4,826,921 | 5/1989 | Andrews et al. .......... 525/207 |
| 4,871,806 | 10/1989 | Shalati et al. ........... 525/207 |
| 4,904,740 | 2/1990 | Blum et al. ............. 525/327.3 |
| 4,906,677 | 3/1990 | Barsotti et al. .......... 525/207 |
| 4,917,955 | 4/1990 | Porter, Jr. et al. ....... 428/413 |
| 4,927,868 | 5/1990 | Schimmel et al. ......... 525/207 |
| 4,937,293 | 6/1990 | Blum et al. ............. 525/207 |
| 4,970,270 | 11/1990 | Blum et al. ............. 525/375 |
| 4,975,493 | 12/1990 | Blum et al. ............. 525/375 |
| 5,043,220 | 8/1991 | Shalati et al. ........... 525/108 |

FOREIGN PATENT DOCUMENTS

| | | |
|---|---|---|
| 1086892 | 12/1956 | Germany . |
| 1019295 | 12/1957 | Germany . |
| 5-295236 | 11/1993 | Japan . |
| 1195122 | 10/1985 | United Kingdom . |
| 2166143 | 10/1985 | United Kingdom . |
| 2195122 | 3/1988 | United Kingdom . |
| 2249791 | 5/1994 | United Kingdom . |
| 1022961 | 6/1983 | U.S.S.R. . |
| 8602660 | 10/1985 | WIPO . |

OTHER PUBLICATIONS

Derwent abstract No. 84-086348/14, Soviet Union Patent No. 1,022,961, Salakhov et al., Jun. 15, 1983.
Derwent abstract No. 77-03269y/02, Soviet Union Patent No. 236,483, Kolesnikov G S, Jul. 2, 1976.

*Primary Examiner*—Robert E. Sellers

[57] ABSTRACT

Compositions of coreactant resins, such as an epoxy resin, and polyanhydrides that contain non-cyclic anhydride moieties are cured to provide coatings that have good exterior durability. Preferred high molecular weight polyanhydrides contain a central polymer moiety that has no more than about 25 weight percent repeating units derived from unsaturated aliphatic hydrocarbon monomers. In other preferred polyanhydrides, the anhydride moieties are linked to a central moiety by an ester moiety.

19 Claims, No Drawings

NON-CYCLIC POLYANHYDRIDE AND EPOXY, POLYOL OR POLYAMINE RESIN

Cross-Reference to Related Application

This is a continuation of application Ser. No. 07/974,569, filed Nov. 12, 1992, now abandoned.

BACKGROUND OF THE INVENTION

The present invention relates to the art of coating compositions.

It is known to apply clear and/or colored coatings to metallic and other articles compositions in order to improve durability and appearance, protect, finish and prevent oxidation of metals. For instance, the exterior panels of many automobiles and other outdoor articles are coated with a multilayer finish that contains: (1) a color coat or basecoat layer and (2) a clear coat layer. See, e.g., Blackburn et al., U.S. Pat. No. 4,732,791 (Mar. 22, 1988), which is incorporated herein by reference.

A common coating composition contains epoxy resins and polymers which contain cyclic anhydrides, such as maleic anhydride and itaconic anhydride polymers and copolymers. See, e.g., Corcoran, U.S. Pat. No. 4,816,500 (Mar. 28, 1989); Barsotti et al., U.S. Pat. No. 4,906,677 (Mar. 6, 1990); and Schimmel, U.S. Pat. No. 4,927,868 (May 22, 1990); and Mika & Bauer, "Curing Agents and Modifiers", Epoxy Resins Chemistry and Technology, 485–92 (Marcel Dekker, Inc. 1988), which are incorporated herein by reference. The components are usually applied in an organic solvent and cured using a catalyst. These coatings are frequently used in outdoor applications, such as clear and color coating on automobiles, storage tanks, rail cars, ships, bridges, utility structures and the like.

Public concerns over the emission of volatile organic compounds have made it desirable to coat such articles using a composition that has a very high solids content. At the same time, it is desirable for the resulting coatings; to have at least about equivalent performance in terms of appearance and exterior durability. What are needed are new resins that can satisfy those concerns.

SUMMARY OF THE INVENTION

One aspect of the present invention is a curable composition comprising:
(a) a polyanhydride that contains: (1) a central moiety, and (2) on average, more than 1 pendant, non-cyclic anhydride moiety bonded to each central moiety; and
(b) a resin that reacts with the polyanhydride to cure under curing conditions.

A second aspect of the present invention is a polyanhydride that comprises:
(a) a polyvalent organic moiety (A);
(b) a plurality of ester linkages bonded to the polyvalent organic moiety;
(c) divalent organic moleties (Q) bonded to the ester linkages; and
(d) non-cyclic anhydride moieties bonded to the divalent organic moleties.

A third aspect of the present invention is a polyanhydride comprising:
(a) a central moiety which contains a polymer that has a molecular weight of at least 1000 and that contains no more than about 25 weight percent of monomer units derived from unsaturated aliphatic hydrocarbon monomers; and
(b) on average more than 2 pendant, non-cyclic anhydride moieties linked 1zo the central moiety.

A fourth aspect of the present invention is a cured composition of the present invention.

A fifth aspect of the present invention is a method to use a curable composition of the present invention, comprising the steps of.
(a) applying a coating of the curable composition to a substrate; and
(b) curing the composition applied in Step (a).

A sixth aspect of the present invention is a coated article comprising: (1) a substrate, and (2) a coating on the substrate having at least one layer which contains a cured composition of the present invention.

The coating compositions of the present invention can be used in mixtures with relatively high solids content for coating substrates. The mixtures usually have a relatively low viscosity, and frequently have a long shelf stability. The coatings have good gloss and distincltness of image. They may also have good chemical etch resistance and exterior durability.

DETAILED DESCRIPTION OF THE INVENTION

Coreactant Resins

Compositions of the present invention contain resins that react with the polyanhydride to cure under a variety of conditions. Although a broad number of resins are useful for this purpose, the coreactant resin is preferably an epoxy resin, a polyol resin, a polyamine or a mixture containing at least one of those resins. Preferred polyol resins include acrylic polyol, hydroxy-containing polyester resins and polyhydroxy polyether resins. Preferred polyamine resins include acrylic polyamine resins and "blocked" amine resins. The most preferred coreactant resin is an epoxy resin.

Suitable coreactant coating resins are well known in the art. Examples of suitable polyol resins are described in Shalati et al., U.S. Pat. No. 4,781,806 (Oct. 3, 1989); Shalati et al., U.S. Pat. No. 5,043,220 (Aug. 23, 1991); Claar et al., U.S. Pat. No. 4,798,746 (Jan. 17, 1989); Andrews et al., U.S. Pat. No. 4,826,921 (May 2, 1989); and Marrion et al., U.S. Pat. No. 4,452,948 (Jun. 5, 1984), which are incorporated herein by reference. The molecular weight of the polyol resin is preferably at least about 200.

Examples of suitable polyamine resins are described in Hutton et al., U.S. Pat. No. 4,043,956 (Aug. 23, 1977); Wellner et al., U.S. Pat. No. 4,279,793 (Jun. 26, 1990); Wellher et al., U.S. Pat. No. 4,970,270 (Nov. 13, 1990); Wellner et al., U.S. Pat. No. 4,975,493 (Dec. 4, 1990); and Blum et al., German Patent 3,819,942 (Jan. 24, 1990), which are incorporated herein by reference. The molecular weight of the polyamine resin is preferably at least about 200.

Examples of suitable epoxy resins and typical conditions for their use are described in Corcoran, U.S. Pat. No. 4,816,500 (Mar. 28, 1989); Barsotti et al., U.S. Pat. No. 4,906,677 (Mar. 6, 1990); Schimmel, U.S. Pat. No. 4,927,868 (May 22, 1990); Blackburn et al., U.S. Pat. No. 4,732,791 (Mar. 22, 1988); Blackburn et al., U.S. Pat. No. 4,755,581 (Jul. 5, 1988); Chatta et al, U.S. Pat. No. 4,710,543 (Dec. 1, 1987); Ambrose et al., U.S. Pat. No. 4,749,743 (Jun. 7, 1988) and Tess, "Epoxy Resin Coatings", *Epoxy Resins Chemistry and Technology*, 719–82

(Marcel Dekker, Inc. 1988), which are incorporated herein by reference.

Examples of suitable epoxy resins include resins created by the reaction of epichlorohydrin and related compounds with phenolic compounds such as bisphenols, novolacs, resorcinol, hydroquinone and the like. Other suitable epoxy resins can be the products of epichlorohydrin with organic polyacid compounds, such as aliphatic acids; (for example glutaric, adipic, azeleic acids ); cycloaliphatic acids (for example cyclohexane dicarboxylic acid or cyclohexane tricarboxylic acid); polymerizable acids (such as methacrylic acid); dimerized fatty acids; and aromatic polyacids (for example phthalic, trimellitic and benzene-tetracarboxylic acids). Other suitable epoxy resins are the product of peroxidation of compounds that contain allylic double bonds or internal cyclic double bonds.

The epoxy equivalent weight of the resin (based on 100 percent solids) is preferably at least about 100 and more preferably at least about 130. It is preferably at most about 3000, and more preferably at most about 1500. The invention is useful with a broad range of epoxy resins, but the average molecular weight of the epoxy resin, is preferably at least about 140 and more preferably at least about 200. The molecular weight is preferably no more than about 10,000.

Polyanhydrides

The present invention also uses polyanhydrides that contain more than one pendant, non-cyclic anhydride group linked to a common central moiety. The polyanhydride is an asymmetrical anhydride, and preferably contains a moiety represented by Formula 1(a):

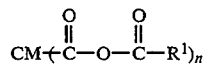

1(a)

wherein (CM) is a central moiety, (R1) is a hydrogen atom or an organic moiety, and n is a number of pendant anhydride groups that averages greater than one.

The central moiety may be a simple organic moiety, such as an aliphatic, cycloaliphatic or aromatic moiety, with a plurality of anhydride groups bonded to it. Alternatively, it may be a polymer or oligomer that contains a plurality of repeating units which are bonded to one or more pendant anhydride groups. (As used in this application, the term "polymer" shall include oligomers and copolymers unless otherwise stated.) Examples of suitable non-polymer central moieties include multivalent phenyl, t-butyl, neopentyl and cyclohexyl structures. Examples of suitable polymeric central moieties include polymers of styrene, acrylic and methacrylic acid and their esters, and/or other ethylenically-unsaturated monomers.

The central moiety is linked to more than one non-cyclic anhydride moiety, on average. It is preferably linked to at least about 2 non-cyclic anhydride groups on average and more preferably to at least about 3 non-cyclic anhydride groups on average. The anhydride equivalent weight (formula weight per anhydride group) is preferably at least about 200 and preferably no more than about 1500.

Each anhydride moiety is typically terminated by a hydrogen atom or an organic group (R1). It is preferably terminated by an organic group. This group is preferably aliphatic and more preferably alkyl. It preferably contains no more than about 6 carbon atoms, more preferably no more than about 4 carbon atoms and most preferably no more than about 1 carbon atom. The terminating group may also contain a ketone or aldehyde functionality, as in the reaction product of a carboxylic acid and a diketene, which results in an acetoacetic anhydride group.

The anhydride moiety need not be bonded to a polymer or backbone. The polyanhydride may optionally contain a polyvalent organic moiety (A) that is linked to a plurality of anhydride groups by a plurality of pendant linking groups (LG), as illustrated in Formula 1(b):

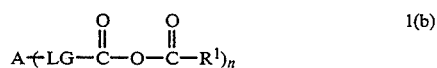

1(b)

The linking group (LG) may contain, for example, ester linkages, alkylene groups, ether linkages urethane linkages and combinations of those. The polyvalent organic group may contain, for example, a polymer or a polyvalent alkyl or aromatic group. The combination of the polyvalent organic moiety (A) and the linking groups (LG) forms the central moiety (CM) as previously described.

The central moiety may optionally contain other functional groups in addition to the pendant non-cyclic anhydride groups. For example, the central moiety may contain pendant acid groups, so that the anhydride is represented by Formula 1(c):

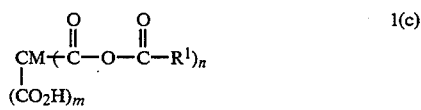

1(c)

wherein m is a number of pendant acid groups and all other characters have the meaning previously given. The molar ratio of pendant non-cyclic anhydride groups to pendant acid groups in the polyanhydride is preferably at least about 25:75, more preferably at least about 50:50, and more highly preferably at least about 75:25. Most preferably, the polyanhydride contains essentially no pendant acid groups.

The central moiety may also contain cyclic anhydride moieties. Preferably, at least 50 percent of the anhydride moieties are non-cyclic, more preferably at least about 75 percent are non-cyclic, more highly preferably at least about 95 percent are non-cyclic and most preferably essentially all are non-cyclic. If the central moiety is a polymer, then the backbone repeating units are preferably not linked by anhydride linkages, like polyanhydrides described in Pettit et al., U.S. Pat. No. 5,055,524 (Oct. 8, 1991), which is incorporated herein by reference. Anhydride linkages between repeating units may also react during curing of the resin.

The preferred molecular weight of the polyanhydride varies depending upon the molecular weight of the coreactant resin. Preferably, if the coreactant resin is a higher molecular weight resin (average molecular weight of about 2000 to about 10000), then the polyanhydride is preferably a low molecular weight resin (average molecular weight of about 1500 or less). If the coreactant resin is a lower molecular weight resin (average molecular weight of no more than about 2000), then the polyanhydride is preferably a higher molecular weight resin (average molecular weight of about 2000 or greater). Usually, the average molecular weight of the polyanhydride is preferably between about 400 and about 10,000.

Many different polyanhydrides that fall within the broad description can provide the desired high solids formulations and high exterior durability of the present invention. However, certain selections of central moiety (CM) and number of pendant anhydride groups (n) are preferred. The preferred description of the polyanhydride changes depending upon its molecular weight.

(A) Higher Molecular Weight Anhydrides

When the central moiety is a polymer or oligomer, the number of monomer units derived from ethylene, propylene and other aliphatic hydrocarbon α-olefins is preferably minimized. Polymers with a high content of ethylene or propylene monomer units do not usually form high solids solutions in common solvents. The polymer preferably contains no more than about 50 weight percent aliphatic hydrocarbon monomer units, more preferably no more than about 25 weight percent, more highly preferably no more than about 10 weight percent, and most preferably essentially none. Monomer units derived from acrylic acid, methacrylic acid and their esters provide greater solubility. They preferably make up at least about 50 weight percent of the polymer and more preferably at least about 75 weight percent. Polyester polymers also usually have good solubility, and so they make good central moieties.

Styrenic monomer units frequently improve the solubility of the polymer, but they may also worsen the exterior durability of the cured coating. The central moiety preferably contains no more than about 25 weight percent aromatic units, such as are derived from styrene, more preferably no more than about 20 weight percent, and most preferably no more than about 15 weight percent aromatic units.

It is theorized that the exterior durability of the cured coating may also be improved if the α-carbon atoms which link the anhydride groups to the central moiety are quaternary carbon atoms, i.e. not bonded to a hydrogen atom. Preferably at least about 50 percent of the α-carbon atoms are quaternary, more preferably at least about 75 percent are quaternary, more highly preferably at least about 90 percent are quaternary and most preferably essentially all are quaternary. Examples of suitable quaternary α-carbon atoms are set out in Formulae 2(a) and (b):

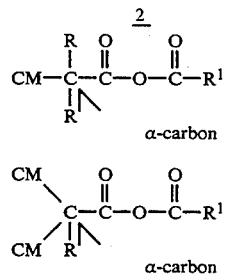

wherein (CM) represents the central moiety and each (R) represents an aliphatic group, which is preferably alkyl and more preferably lower alkyl (one to six carbon atoms). For instance, the pendant linear anhydride groups may be bonded to units derived from methacrylic acid, rather than to units derived from acrylic acid. The molecular weight of the central moiety is preferably at least about 1000 and more preferably at least about 1500. Examples of processes used to make high molecular weight anhydrides are described in numerous references, such as Maloney, U.S. Pat. No. 3,523,930 (Aug. 11, 1970); Vaughn et al., U.S. Pat. No. 3,631,156 (Dec. 28, 1971); Vaughn, U.S. Pat. No. 3,631,157 (Dec. 28, 1971); Vaughn, U.S. Pat. No. 3,803,087 (Apr. 9, 1974); and Vaughn, U.S. Pat. No. 4,308,363 (Dec. 29, 1981), which are incorporated herein by reference. These references teach that polyanhydrides can be made by reacting: (a) a polyacid that has more than two pendant acid groups; with (b) an acylating agent such as an anhydride, an acid halide or a ketene.

The polyacid is preferably highly soluble in at least some common solvents, such as hydrocarbon solvents (for example toluene or xylene), chlorinated hydrocarbons, ketones, esters, glycol ethers, polyethers (for instance, glyme or diglyme) or common polar aprotic solvents. It preferably forms mixtures in at least one of those solvents at about room temperature that contain at least 50 weight percent solids, more preferably at least about 60 weight percent and most preferably at least about 70 weight percent. Solubility can be measured using any of those solvents, but it is conveniently measured in xylene.

Suitable polyacids can be made by several different methods, such as by polymerization of polymers and copolymers containing acrylic or methacrylic acid. Many polymers of acrylic and methacrylic acid are commercially available, and others can be synthesized by well known processes. See, e.g., 1 Encyclopedia Poly. Sci. & Eng. (2d Ed.), *Acrylic and Methacrylic Acid Polymers*, at 221–224 (J. Wiley & Sons 1985).

(B) Lower Molecular Weight Anhydrides

Lower molecular weight anhydrides preferably contain:
(a) a polyvalent organic moiety (A);
(b) a plurality of ester linkages bonded to the polyvalent organic moiety;
(c) divalent organic moieties (Q) bonded to the ester linkages; and
(d) non-cyclic anhydride moieties bonded to the divalent organic moieties.

For example, the lower molecular weight anhydride is preferably represented by Formula 3(a):

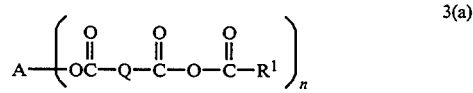

wherein (A) is the polyvalent organic moiety, (Q) is the divalent organic moiety, and all other characters have the meaning previously described. Of course, the polyvalent organic moiety (A), the ester linkages and the divalent moieties (Q) in combination form the central moiety (CM) previously described. (A) may also contain, or be linked to, other pendant, non-linear anhydride moieties which are not linked by an ester moiety.

The preferred lower molecular weight anhydrides can be made from a corresponding polyacid (see Formula 3(b)), using the same anhydride-forming reactions that were previously described:

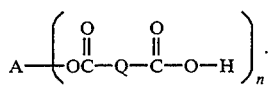

3(b)

The polyacid can be made by reacting a cyclic anhydride with a polyol. See, e.g., Singer et al., U.S. Pat. No. 4,703,101 (Oct. 27, 1987) and Schimmel et al., U.S. Pat. No. 4,927,868 (May 22, 1990), which are incorporated herein by reference. In the resulting acid, the polyvalent organic moiety (A) is derived from the polyol, and the divalent organic moiety (Q) is derived from the cyclic anhydride. Examples of suitable polyols include phloroglucinol, diresorcinol, glycols, glycerine, trimethylolpropane, pentaerythritol, sorbitol, glucose and/or other sugars. Examples of suitable cyclic anhydrides include maleic, succinic, itaconic, citraconic, glutaric, phthalic and hexahydrophthalic anhydride.

Each (A) and (Q) is preferably aliphatic, aromatic or aliphatic-aromatic. Each aliphatic group is preferably alkyl. Each (A) and (Q) preferably contains no more than about 12 carbon atoms and more preferably no more than about 7 carbon atoms. On average the central moiety is preferably linked to at least about 3 pendant anhydride groups, and more preferably at least about 4 pendant anhydride groups. On average, it is preferably linked to at most about 6 anhydride groups and more preferably at most about 4 anhydride groups. A highly preferred lower-molecular weight polyanhydride is represented by Formula 3(a) wherein (A) is an aliphatic moiety and (Q) is a cycloaliphatic moiety. The most preferred cycloaliphatic group is a divalent cyclohexane group. The ester and anhydride are preferably in a 1,2-position with respect to each other. The terminating aliphatic group bonded to the anhydride is preferably a lower ($C_1$–$C_6$) alkyl group and is most preferably a methyl group.

The low molecular weight polyanhydride is preferably represented by Formula 4:

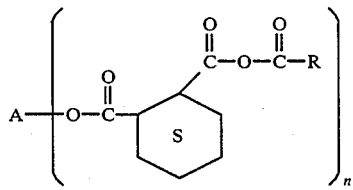

4 or a substituted variation thereof, wherein (A) is an alkyl group, R is a hydrogen atom or a lower alkyl group, and n is a number of substituent groups averaging greater than 1. n is preferably about 3 to 4, inclusive. R is most preferably a lower alkyl group. (A) is preferably a multivalent alkyl group containing about 5 to 12 carbon atoms, such as a neopentane group and related alkyl structures. It can be synthesized by: (1) reacting pentaerythritol or a related polyol with hexahydrophthalic anhydride; and (2) reacting the product of that reaction with an acid anhydride (such as acetic anhydride), an acid halide (such as acetyl chloride) or a ketene.

Coating Compositions

Coating compositions of the present invention contain a polyanhydride and a coreactant resin. They may be applied as powder coatings, but they are preferably formulated into high solids coating systems dissolved in a solvent or a blend of solvents. The solvent is usually organic. Examples of preferred solvents contain aromatic hydrocarbons, such as petroleum naphtha or xylenes; ketones, such as methyl amyl ketone, methyl isobutyl ketone, methyl ethyl ketone or acetone; ester solvents, such as butyl acetate, hexyl acetate, or glycol ether esters, such as propylene glycol monomethyl ether acetate.

The equivalent ratio of the coreactant resin and the polyanhydride is preferably at least about 0.8:1, more preferably at least about 0.9:1 and most preferably at least about 1:1. The equivalent ratio is preferably at most about 1.3:1, more preferably at most about 1.2:1 and most preferably at most about 1.1:1. The polyanhydride and coreactant resin may be partially cured before they are applied to a substrate, but they preferably are not.

The composition may contain other suitable additions, such as catalysts, pigments, stabilizers, toughening agents and fillers.

It usually contains a catalyst when it is cured. Examples of suitable catalysts are described in: Smith, U.S. Pat. No. 3,784,583 (Jan. 8, 1974); Smith U.S. Pat. No. 3,979,355 (Sep. 7, 1976); Marrion et al., U.S. Pat. No. 4,452,948 (Jun. 5, 1984); Shalati et al., U.S. Pat. No. 4,871,806 (Oct. 3, 1989); Lee & Neville, *Handbook of Epoxy Resins* 12-13 (McGraw-Hill 1967); and Mika & Bauer, *Epoxy Resins* 487 (Marcel Dekker, Inc. 1988), which are incorporated herein by reference. For example, the catalyst may be a quaternary phosphonium salt (such as ethyltriphenylphosphonium chloride), a quaternary ammonium salt (such as tetrabutylammonium bromide), or a tertiary amine (such as dimethylethanolamine. The composition usually contains between 0.1 and 5 weight percent catalyst, based upon the weight of solids.

The other materials depend upon its intended use. If the composition is intended for a clear coating, then it preferably does not contain fillers, pigments or other materials that can adversely effect the clarity of the cured coating. On the other hand, if it is intended as a color coating, then it should contain the desired pigments.

The total solids content for a formulation of solvent, coreactant resin, anhydride and other solids in the composition is preferably low enough so that the viscosity of the composition is within a range that is suitable for its intended use. For instance, the viscosity for an air-spraying composition at 25° C. is preferably at most about 150 cps, more preferably at most about 110 cps, and most preferably at most about 70 cps; whereas the viscosity of an airless spraying composition at 25° C. is preferably at most about 5000 cps. The solids content is preferably at least about 50 weight percent, more preferably at least about 65 weight percent, and most preferably at least about 70 weight percent. The solids content is preferably as high as practical, but it is usually no more than about 95 weight percent (unless the composition is applied as a powder, in which case it contains about 100 percent solids).

The composition is applied to a substrate in ordinary ways for coating, such as by conventional spraying, electrostatic spraying, roller coating, dipping or brushing. It is particularly useful as a clear or color coating for outdoor articles, such as automobile and other vehicle body parts. The substrate may be prepared with a primer and/or a color coat or other surface preparation before coating.

The composition becomes a useful thermoset coating by heating at a temperature at which the formulation cures. For most resins, that temperature is between about 80° C. and about 180° C., although some coreactant resins can be formulated to cure even at ambient temperature.

The resulting coated article contains a substrate layer and at least one coating layer that contains a cured composition of the present invention. The layer containing the cured composition need not be adhered directly to the substrate; there may optionally be intervening layers. One preferred coated article system contains:

(a) the substrate;
(b) optionally, a primer or surface treatment layer adhered to the substrate;
(c) a color layer adhered either to the substrate or to the primer or surface treatment layer; and
(d) a clear coat layer adhered to the primer layer, wherein either the color layer or the clear coat layer contains a cured composition of the present invention. The thickness of each layer is dictated primarily by user specifications, and varies depending upon the intended use.

The cured composition preferably has a gloss of at least about 80 percent, and more preferably at least about 90 percent, as measured by a BYK MULTI-GLOSS multiangle gloss meter at about 20 degrees normal to the surface. It's distinctness of image is preferably at least about 85 and more preferably at least about 90, as measured by a DORI-GON D47-6 meter manufactured by Hunter Laboratories. Its exterior durability may be tested by common "accelerated" test methods such as with a Cleveland Q-Panel QUV unit. The results of such tests (for a UV-stabilized coating) are preferably less than 20 percent loss of gloss (measured at 20° normal to the panel surface) after 3000 hrs of irradiation at either 313 nm or 340 nm.

The compositions of the present invention can easily be formulated with high solids content, so that lower quantities of solvent can be used if desired. They can be cured to provide coatings with superior exterior durability.

The invention is further illustrated by the following examples.

Illustrative Examples

The following examples are for illustrative purposes only. They should not be taken as limiting the scope of either the specification or the claims. Unless stated otherwise, all parts and percentages are by weight.

EXAMPLE 1

Coating Composition Containing Epoxy Resin and Anhydride Oligomer

Equimolar portions of pentaerythritol and trimethylol propane are placed in a reactor. A blend of 70 percent methylhexahydrophthalic anhydride and 30 percent hexahydrophthalic anhydride is added in stoichiometric quantities to the reactor. The mixture is heated and stirred at 170° C. until it becomes clear. A mixture of xylenes is added to make an 80 percent solids mixture. A catalytic amount of dimethylaminopyridine is added and the reaction is continued at 135° C. for three hours. The acid equivalent weight is determined by titration with aqueous potassium hydroxide.

A portion of the mixture containing 10.25 equivalents of acid is diluted with xylenes to 60 percent solids. A 1.3x stoichiometric quantity of acetic anhydride is added and the mixture is stirred for fourteen hours. The pressure is reduced to 300 mmHg and the temperature is increased to 60° C. for 2 hours. A 500 g quantity of xylenes is added to maintain an azeotropic distillation of 3 ml/min. over a period of four hours. After the distillation, the reactor is fitted with a Soxhlet extractor that contains 3 mol. of anhydrous sodium carbonate. The temperature is increased to 75° C. and the pressure is reduced slowly to 90 mmHg. The "closed" system is then allowed to reflux for several hours, during which time acetic acid reacts with sodium carbonate in the extractor thimble to an acceptable minimum. The resulting pale yellow resin has a Gardner color of 1 and a Brookfield viscosity of 885 cps at 25° C. Its theoretical anhydride equivalent weight is about 349 at 65.5 percent solids.

550 parts of the anhydride resin are formulated with 206 parts diglycidyl cyclohexane dicarboxylate, 6.7 parts tertiary amine catalyst, 22.2 parts hydroxybenzotriazole UVA, 14.8 parts HALSt 1.5 parts flow modifier and 150 parts propylene glycol methyl ether acetate. The mixture is applied by spray at about 63.8 percent solids concentration to steel panels precoated with a waterborne white enamel basecoat. After two minutes flash time, the panels are heated to 135° C. for 30 minutes to cure.

The properties of the cured coating are tested and are set out in Table 1.

TABLE 1

| Test | Result |
| --- | --- |
| MEK double rubs | 100 + (no marring) |
| Knoop Hardness | 6.6 +/− 0.5 |
| Average film thickness | 1.99 mil |
| Hunter ΔB (yellowness) | 1.2 +/− 8.5% |
| 24 hour 5% NaOH | no stain, mar or erosion |
| 24 hour 5% HCl | no stain, mar or erosion |
| 20° Gloss | 83 +/− 1 |
| Distinctness of Image | 87 +/− 1 |

EXAMPLE 2

Coating Composition Containing Epoxy Resin and Anhydride Polymer

A copolymer containing about 40 weight percent methacrylic acid and about 60 weight percent butyl acrylate is prepared according to the process described in U.S. Pat. No. 4,906,677. A 51 percent solution of the resin in a mixture of xylenes, butyl acetate and propylene glycol monomethylether acetate is heated to 125° C., and the reactor is sparged with nitrogen to remove volatiles. About 1.1 equivalents of acetic anhydride is added dropwise over about 1.66 hours, and heating is continued for another 5 hours. During this time, 100 ml of propylene glycol methyl ether acetate is added to maintain temperature at 125° C. and 280 ml of acetic acid/solvent azeotrope is recovered. The resulting solution contains 59.4 percent polyanhydride with an anhydride equivalent weight of 974 and an acid equivalent weight of 627, as determined by titration.

A composition that contains 88.7 parts polyanhydride, 37.10 parts diglycidyl cyclohexane dicarboxylate, 1.05 parts triethylenediamine and 6.9 parts mixed xylenes is formulated. The composition is applied, cured at 121° C. and tested as described in Example 1. The results are set out in Table 2:

TABLE 2

| Test | Result |
|---|---|
| MEK double rubs | 200 + (no marring) |
| Knoop Hardness | 5.2 |
| Average film thickness | 2.56 mm |
| Hunter ΔB (yellowness) | 1.35 +/− 0.13% |
| 24 hour 5% NaOH | no stain, mar or erosion |
| 24 hour 5% HCl | no stain, mar or erosion |

What is claimed is:

1. A curable composition comprising:
   (a) a polyanhydride that contains: (1) a central moiety, and (2) on average, more than 1 pendant, non-cyclic anhydride moiety bonded to each central moiety; and
   (b) an epoxy resin.

2. The composition of claim 1 that is in the form of a powder coating.

3. The composition of claim 1 which further comprises a solvent.

4. The composition of claim 3 wherein the solvent contains an aromatic hydrocarbon, a ketone, an ester solvent.

5. The composition of claim 3 wherein the polyanhydride resin contains on average at least about 2 anhydride moieties per molecule.

6. The composition of claim 5 wherein the anhydride equivalent weight of the polyanhydride is on average at least about 200 and at most about 1500.

7. The composition of claim 6 wherein the polyanhydride comprises a moiety represented by the Formula:

$$A\underset{}{\underbrace{\left(OC-Q-\overset{O}{\underset{\|}{C}}-O-\overset{O}{\underset{\|}{C}}-R^1\right)_n}}$$

wherein:
   (A) is a multivalent organic moiety;
   (Q) is a divalent organic moiety;
   (R') is a hydrogen atom or an organic moiety; and
   n is a number of pendant groups that is at least about 2.

8. The composition of claim 7 wherein (Q) is derived from an anhydride ring opening reaction of maleic anhydride, succinic anhydride, itaconic anhydride, citraconic anhydride, glutaric anhydride, phthalic anhydride, hexahydrophthalic anhydride, methylhexahydrophthalic anhydride or an alkenylsuccinic anhydride.

9. The composition of claim 3 wherein the polyanhydride contains a moiety represented by the Formula:

$$CM\underset{}{\left(\overset{O}{\underset{\|}{C}}-O-\overset{O}{\underset{\|}{C}}-R^1\right)_n} \quad 1(a)$$

wherein (CM) contains a polymer which has an average molecular weight of at least about 1000, (R1) is a hydrogen atom or an organic moiety, and n is a number of anhydride moieties which averages greater than one.

10. The composition of claim 9 wherein the central moiety (CM) is a polymer that contains no more than about 25 weight percent repeating monomer units derived from unsaturated aliphatic hydrocarbon monomers.

11. The composition of claim 3 wherein the equivalent ratio of the epoxy resin and the polyanhydride resin is between about 0.8:1 and about 1.3:1.

12. The composition of claim 3 wherein the solids content of the composition is at least about 55 weight percent.

13. The composition of claim 3 which further comprises a curing catalyst.

14. The composition of claim 3 wherein the composition is curable to provide a coating having a gloss of at least about 80 percent and a distinctness of image of at least about 85.

15. A cured composition of claim 1.

16. The composition of claim 12 wherein the polyanhydride contains on average at least about 3 non-cyclic anhydride groups.

17. The composition of claim 16 wherein the polyanhydride has an anhydride equivalent weight of about 200 to about 1500.

18. The composition of claim 16 wherein the polyanhydride is represented by the Formula:

$$A\underset{}{\left(O-\overset{O}{\underset{\|}{C}}-\underset{S}{\bigcirc}-\overset{O}{\underset{\|}{C}}-O-\overset{O}{\underset{\|}{C}}-R\right)_n} \quad 4$$

wherein A is an alkyl group having no more than about 12 carbon atoms, R is a lower alkyl group, and n is about 3 to 4, on average.

19. The composition of claim 18 wherein the composition contains at least about 65 weight percent solids.

* * * * *